US005307176A

United States Patent [19]
Dweck et al.

[11] Patent Number: 5,307,176
[45] Date of Patent: Apr. 26, 1994

[54] SYSTEM FOR STORING AND RETRIEVING DUPLICATE FASCIMILE INFORMATION

[75] Inventors: Mark Dweck, 20 Old Colony La., Great Neck, N.Y. 12020; David Lerner, New York, N.Y.

[73] Assignee: Mark Dweck, Great Neck, N.Y.

[21] Appl. No.: 983,891

[22] Filed: Dec. 1, 1992

Related U.S. Application Data

[63] Continuation of Ser. No. 627,012, Dec. 13, 1990, abandoned.

[51] Int. Cl.$^5$ .............................................. A04N 1/00
[52] U.S. Cl. ..................... 358/403; 358/442; 358/468
[58] Field of Search ............... 358/402, 403, 407, 434, 358/437, 468, 442

[56] References Cited
U.S. PATENT DOCUMENTS 4,321,703 3/1982 Schwaertzel et al. ............... 358/403
4,352,012 9/1982 Verderber et al. ................... 358/403
4,646,160 2/1987 Iizuka et al. ......................... 358/468
4,786,974 11/1988 Ina ....................................... 358/434
4,920,427 4/1990 Hirata ................................. 358/437
4,991,028 2/1991 Kokubu ............................... 358/403
5,161,037 11/1992 Saito .................................... 358/468
5,224,180 6/1993 Tadokoro ............................ 358/434

FOREIGN PATENT DOCUMENTS 0673971 6/1981 Japan .

Primary Examiner—Edward L. Coles, Sr.
Assistant Examiner—Thomas L. Stoll
Attorney, Agent, or Firm—Henry R. Lerner

[57] ABSTRACT

A stand alone add on system and apparatus for storing and retrieving duplicate facsimile information capable of working in conjunction with a simple facsimile machine. The duplicate facsimile information can be stored in memory, displayed on a screen or be reproduced in multiple fashion.

8 Claims, 4 Drawing Sheets

SYSTEM FOR STORING AND RETRIEVING DUPLICATE FASCIMILE INFORMATION

This is a continuation of copending application(s) Ser. No. 07/627,012 filed on Dec. 13, 1990, now abandoned.

BACKGROUND OF THE INVENTION

Facsimile transmission systems are useful in conveying visual information from one location to another. A facsimile system is an electronic system which uses communications to transmit graphic material. Normal facsimile operation involves an exchange of handshaking signals between the distant and local facsimile machines and specific acknowledgements relating to the receipt of specific transmission information.

The first facsimile machines were relatively simple devices which received data signals and converted them into pictorial copy format. More recently, advanced facsimile machines incorporate a multitude of computer defined functions. These newer machines are able to incorporate such features as multiple copies derived from a single data transmission and storage of such data for an indefinite period of time. Such features increase the versatility of facsimile machines. Because many facsimile machines were sold before these features were available, there exists a heretofore unfulfilled need for a device which is capable of adding these features on to a basically featureless facsimile machine.

SUMMARY OF THE INVENTION

It is therefore an object of this invention to increase the capacity of a simple facsimile machine without having to replace it.

A further object of this invention is to allow a simple facsimile machine to produce multiple copies of information received.

Yet another object of this invention is to provide a means for storing information transmitted during a facsimile transmission.

The invention relates to a stand alone system for storing and retrieving duplicate facsimile information which works in conjunction with a simple facsimile machine. The system is capable of storing a facsimile message in data form while the facsimile machine is receiving it. At a point later in time, the stored facsimile message can be retrieved by sending it to the facsimile machine which receives it as though it were an original transmission. Moreover, the stored facsimile message may be sent to a computer with appropriate software for on-screen display, storage, or manipulation. Multiple copies of the facsimile message can be generated by repeating the retrieval process. In addition to the storage and duplication functions, the system also serves as a back-up facsimile receiver should the normal facsimile machine fail or run out of paper.

Other objects and advantages of this invention will be appreciated by those skilled in the art by reference to the following specification and accompanying drawings.

DETAILED DESCRIPTION OF THE INVENTION

Figure 1:
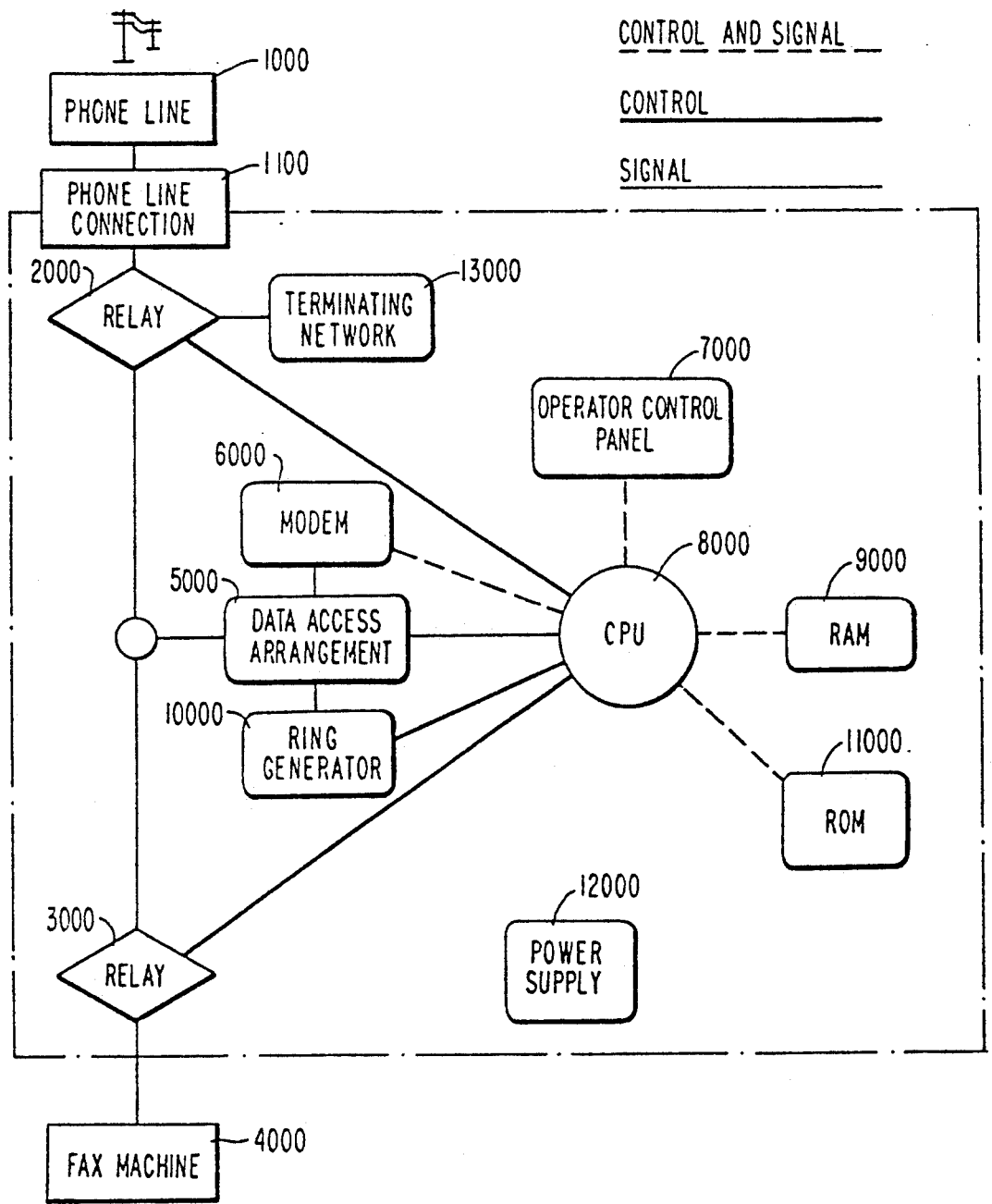
FIG. 1 is a block diagram of an electronic system for storing and retrieving duplicate facsimile information.

Turning now to FIG. 1, the instant invention is shown coupled between an incoming phone line 1000 and a facsimile machine. More specifically, the phone line 1000 is connected by means of a phone line connection 1100 to a first relay 2000 such as a double pole double throw relay. A terminating network 13000 is connected to an output of the first relay 2000. The first relay 2000 is controlled by an output of a central processing unit 8000 (CPU). The first relay 2000 is connected, by means of another output, to an input of a second relay 3000. The second relay 3000 is connected by means of an output to a facsimile machine 4000. The second relay 3000 is controlled by an output terminal of the CPU 8000. The telephone line connection is made through a standard data access arrangement system 5000 (DAA) pursuant to FCC regulations. Thus, the telephone line 1000 is connected through the first relay 2000 to the DAA 5000 and also through the second relay 3000 to the facsimile machine 4000. The DAA 5000 provides a signal to the CPU 8000 to indicate when ringing is detected on the telephone line 1000. A conventional modem 6000 has an input connected to the DAA 5000 and is also connected to an input/output of the CPU 8000. The DAA 5000 connects audio signals (from the external phone line 1000 or the facsimile machine 4000, depending upon the relative relay positions) to the modem 6000. The modem 6000 demodulates the audio signal received on the phone line 1000 and sends it to the CPU 8000. The modem 6000 also converts signals received from the CPU 8000 into audio signals to be sent over the telephone line 1000, or to the facsimile machine 4000.

By operation of the first relay 2000 and the second relay 3000, the DAA 5000 may be bridged across the telephone line 1000, which is also connected through to the facsimile machine 4000. The DAA 5000 may be connected directly so as to terminate the telephone line 1000 (in which case the facsimile machine 4000 is disconnected from the telephone line 1000). The DAA 5000 may also be connected through to terminate the facsimile machine 4000, while the telephone line 1000 is left idle (or alternatively is "busied out" by operation of the first relay 2000 and the terminating network 13,000).

An operator control panel 7000 is connected to the CPU 8000 to send instructions and cause the CPU 8000 to follow set programs and perform pre-established routines in accordance with the teachings of this invention. The CPU 8000 is a microprocessor which operates under control of a program stored in a read only memory 11,000 (ROM) which is connected to the CPU 8000 in a conventional manner. A random access memory (RAM) is also connected to the CPU 8000 in a conventional manner and thus receives and stores information. A power supply 12,000 is shown in block form and is used to supply power to the requisite voltage levels that are required by the electronic system components. A ring generator 10,000 may be caused to operate under the control of the CPU 8000 and is connected through the second relay 3000 to initiate operation of the facsimile machine 4000, which is connected to the output of the second relay 3000.

Figure 2:
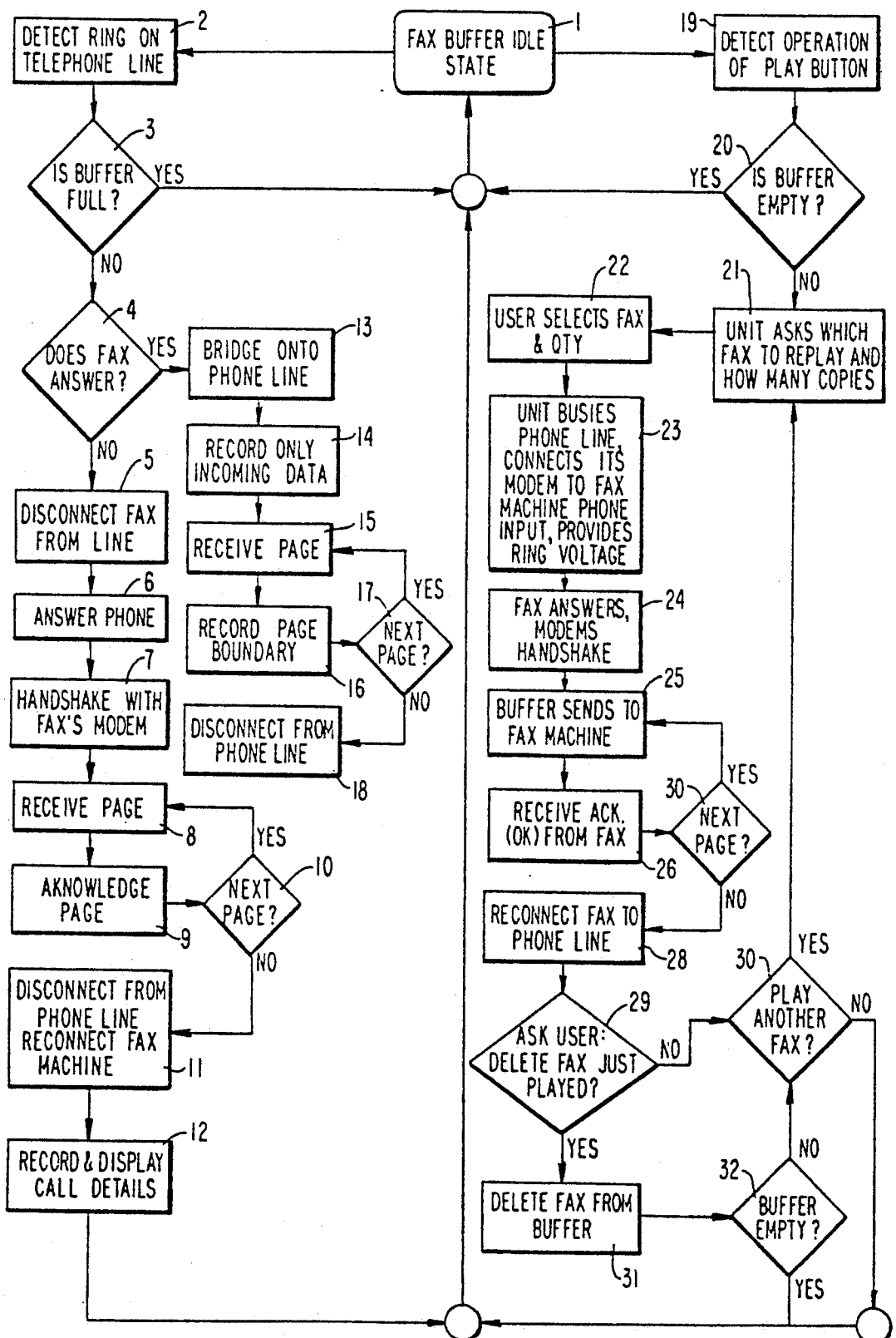
FIG. 2 is a flow chart generally depicting the operation of the instant invention.

Turning now to FIG. 2, a flow chart depicts the various operations of the instant invention. In the "idle" state as in block 1, the CPU 8000 is constantly monitoring both the ring indicator signal from the data access arrangement 5000 and scanning for any input from the operator control panel 7000. If a ring signal is detected as in block 2 on the telephone line 1000, the CPU monitors to see if the buffer is full as in block 3 and if it is, the unit returns to its idle state as in block 1, optionally recording the date and time of the facsimile that it is "missing". If the buffer is not full, the CPU 8000 monitors to detect whether the facsimile machine 4000 answers the call as in block 4 entitled "does fax answer?".

If the facsimile machine 4000 answers the call within a predetermined number of rings, the CPU 8000 causes the data access arrangement 5000 to bridge onto the phone line 1000 as in block 13 and feed phone line audio through to the modem 6000. The modem 6000 passes the digital data to the CPU 8000, which stores each page of information into random access memory 9000, and detects the saved page break information as in blocks 14 (entitled "record only incoming data"), 15 (entitled "receive page") and 16 (entitled "record page boundary"). The CPU 8000 will discriminate and ignore the acknowledgement signals sent by the facsimile machine 4000, and they will not be recorded. The CPU 8000 monitors whether more pages are being received as in block 17 (entitled "next page?") If so, then the steps indicated in blocks 14-16 are repeated. When the transmission is completed, the CPU 8000 will cause the data access arrangement 5000 to drop the bridged audio connection to the phone line 1000 as in block 18. The date, time, and calling facsimile number will be stored into memory along with the facsimile data itself, and the identifying information may be displayed on the operator console 7000.

If the facsimile machine 4000 does not answer the phone call within a predetermined number of rings, the CPU 8000 will cause the relay 3000 to disconnect the facsimile machine 4000 from the telephone line 1000 as in block 5 and answer the phone as in block 6, and will then provide, through the modem 6000, normal handshaking with the calling facsimile machine as in block 7 (entitled "handshake with fax's modem"). The device will then act like a normal facsimile machine, receiving each page as in block 8 and sending standard acknowledgement (or error messages) as in block 9 (entitled "acknowledge page"). The CPU 8000 monitors whether more pages are being received as in block 10, and if so, the steps indicated in blocks 8-10 are repeated. When the transmission is completed, the CPU 8000 will cause the data access arrangement 5000 to drop the terminating audio connection to the phone line 1000 and cause relay 3000 to reconnect the facsimile machine 4000 as in block 11. The date, time and calling facsimile number will be stored into memory, along with the facsimile data itself, and the identifying information may be displayed on the operator console 7000 as in block 12 (entitled "Record and display call details").

After either scenario, the unit then returns to the idle state as in block 1. If the "play" button is pushed by an operator of the system, the CPU 8000 will detect operation of the play button as in block 19. The CPU 8000 then monitors to see if the buffer is empty as in block 20. If there is nothing in the buffer, the button push will be ignored and the buffer will return to the idle state as in block 1. If there are one or more facsimiles in the buffer, the CPU 8000 will ask the user to specify which facsimiles to replay and to indicate how many copies of each as in block 21. The user selects which facsimile and what quantity is desired as in block 22. The facsimile machine 4000 is then disconnected from the phone line 1000, the modem 6000 is connected to the facsimile machine phone input, and connected to an interrupted ring signal supplied by the ring generator as in block 23. Optionally, if permitted by government regulations, the incoming telephone line will be connected to a terminating network, so that it is "busied out" during the period that the facsimile buffer and the facsimile machine 4000 are unavailable to receive new facsimiles.

When the facsimile machine 4000 answers the ringing phone line, the facsimile buffer's modem 6000 will be connected, through the data access arrangement 5000, to the facsimile machine 4000, and the normal facsimile to facsimile handshake will be effected as in block 24. The buffer, under the control of the CPU 8000, will then transmit each page of the stored facsimile to the facsimile machine 4000 as in blocks 25 (entitled "buffer sends to fax machine"), 26 (entitled "receive back (ok) from fax"), and 27 (entitled "next page?"). Any special cover pages or routing instructions that the user may have programmed may be added as well. When there are no further pages, the facsimile machine 4000 is reconnected to the external phone line 1000 as in block 28.

When a facsimile replay is completed, the buffer will prompt the user by beeping and asking, as in block 29, "delete facsimile just played?" and the user may choose to delete the facsimile message or to retain it in memory. If the user chooses to retain the facsimile or provides no response, the message will be retained, with an indication on the display that it has already been replayed. If there are additional facsimiles in the buffer, the user will be asked whether to play another facsimile, as in block 30 and the process will be repeated as is illustrated in blocks 21-30 until the CPU 8000 determines that the buffer is empty as in block 32 or the user instructs it to stop replaying facsimiles. The buffer will then return to the idle state as in block 1 and the CPU 8000 will reconnect the facsimile machine 4000 to the phone line 1000.

Figure 3:
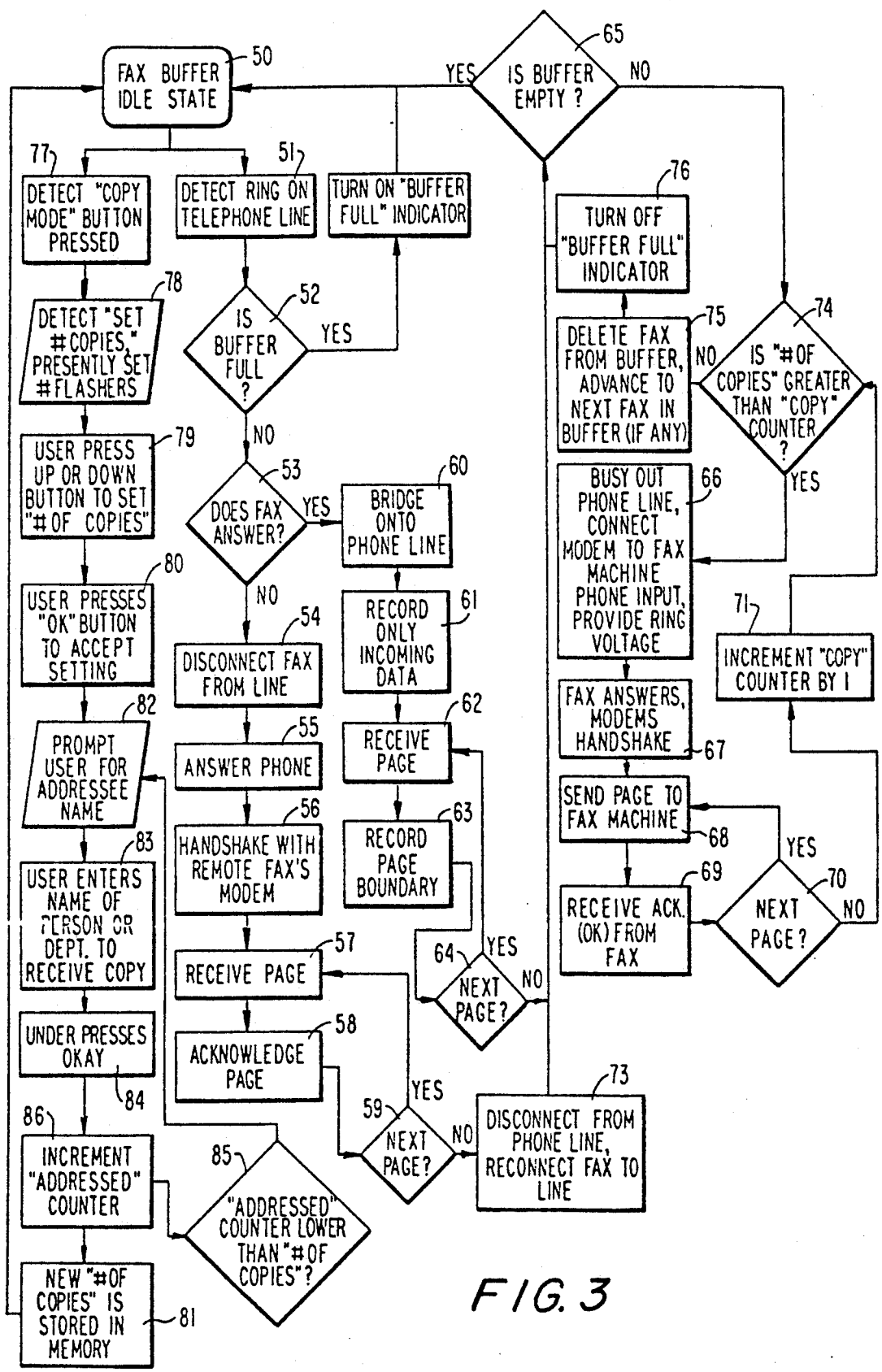
FIG. 3 is a flow chart depicting operation of an automatic multiple copy format in accordance with the instant invention.

In the practice of the invention, the user may program the number of copies desired and may optionally program a number of addressees or recipients for each copy. Thus, when an incoming facsimile message is received, multiple copies may be automatically made at that time. FIG. 3 illustrates a buffer according to the instant invention in multiple copy mode, wherein the user may enter the number of copies desired by first causing the CPU 8000 to detect that the copy mode button has been pressed as in block 77. The CPU 8000 then displays the number of copies that have presently been called for on the operator control panel 7000 as in block 78. The user may then increase or decrease the number of copies desired as in block 79. The number of copies is then confirmed and entered as in block 80. The new number of copies is then stored in RAM 9000 as in block 81.

The user may optionally enter information to direct copies to various recipients. After entering the desired number of copies, the CPU 8000 may prompt the user for the name and/or location of a recipient as in block 82. The user then enters the name of a person or department or location as in block 83 and then confirms the entry as in block 84. The user may desire to have each copy directed to a particular address. The CPU 8000 keeps track of the number of copies in relation to the number of addressees by indicating on the operator control panel 7000 the number of addressees that have been entered as in block 86. If the number of addressees is lower than the number of copies as in block 85, the CPU 8000 will prompt the user for the next addressee as in blocks 82 through 86 until the number of addressees equals the number of copies. Thus, the number of copies and number of addressees are stored in RAM 9000. The unit is now ready to implement its function.

In the "idle" state as in block 50, the CPU 8000 is constantly monitoring both the ring indicator signal from the data access arrangement 5000 and scanning for any input from the operator control panel 7000. If a ring signal is detected as in block 51, the CPU monitors to see if the buffer is full as in block 52, and if it is, the CPU 8000 causes the operator control panel 7000 to indicate that the buffer is full as in block 52a. If the buffer is not full, the CPU 8000 monitors to detect whether the facsimile machine 4000 answers the call as in block 53 (entitled "does fax answer?").

If the facsimile machine 4000 answers the call within a predetermined number of rings, the CPU 8000 causes the data access arrangement 5000 to bridge on to the phone line 1000 as in block 60 and feed phone line audio through the modem 6000. The modem 6000 passes the digital data to the CPU 8000, which stores each page of information into random access memory 9000, and detects the saved break information as in blocks 61 (entitled "record only incoming data"), 62 (entitled "receive page"), 63 (entitled "record page boundary"). The CPU 8000 will discriminate and ignore the acknowledgement signals sent by the facsimile machine 4000, and they will not be recorded. The CPU 8000 monitors whether more pages are being received as in block 64 (entitled "next page?"). If yes, then the steps indicated in blocks 62–64 are repeated. When the transmission is completed, the CPU 8000 will cause the data access arrangement 5000 to drop the bridged audio connection to the phone line 1000 and reconnect the facsimile machine 4000 to the phone line 1000, as in block 73. The date, time, and calling facsimile number will be stored into memory along with the facsimile data itself, and the identifying information may be displayed on the operator console 7000.

After the facsimile machine 4000 has been reconnected to the phone line 1000 the CPU 8000 checks to see if the buffer is empty as in block 65. If it is empty, the facsimile buffer goes back to the idle state as in block 50. If the buffer is not empty, the CPU 8000 checks to see if the number of copies desired by the user and programmed into the system, as in blocks 77–86, is a number greater than the number actually printed as in block 74. If not greater, no more copies are called for, and the facsimile information is deleted from the buffer and the unit advances to the next facsimile message stored in the buffer, if any exists, as in block 75. If the buffer was full as a result of the last facsimile message, deletion of that facsimile message enables the CPU 8000 to turn off a "buffer full" indicator that appears on the operator control panel 7000.

If the number of copies desired by the user and programmed into the system is greater than the amount of copies that have actually been printed, the CPU 8000 will disconnect the facsimile machine 4000 from the phone line 1000, which is "busied out" by the terminating network 13,000 under the direction of the CPU as in block 66. Furthermore, the modem 6000 is connected to the facsimile machine phone input and connected to an interrupted ring signal supplied by the ring generator, also as in block 66. When the facsimile machine 4000 answers the ringing phone line, the modem 6000 will be connected through the data access arrangement 5000 to the facsimile machine 4000, and the normal facsimile to facsimile handshake will be effected as in block 67. The buffer, under the control of the CPU 8000, will then transmit each page of the stored facsimile to the facsimile machine as in blocks 68 (entitled "send page to fax machine"), 69 (entitled "receive ack.(OK) from fax"), and 70 (entitled "next page?"). If there are no additional pages, the increment copy counter indicating number of copies completed advance by one as in block 71. If the number of copies are equal to the number of copies desired and programmed by the user as in block 74, the facsimile message is deleted from the buffer and the unit is ready to receive or copy the next facsimile in the buffer as in block 75.

Figure 4:
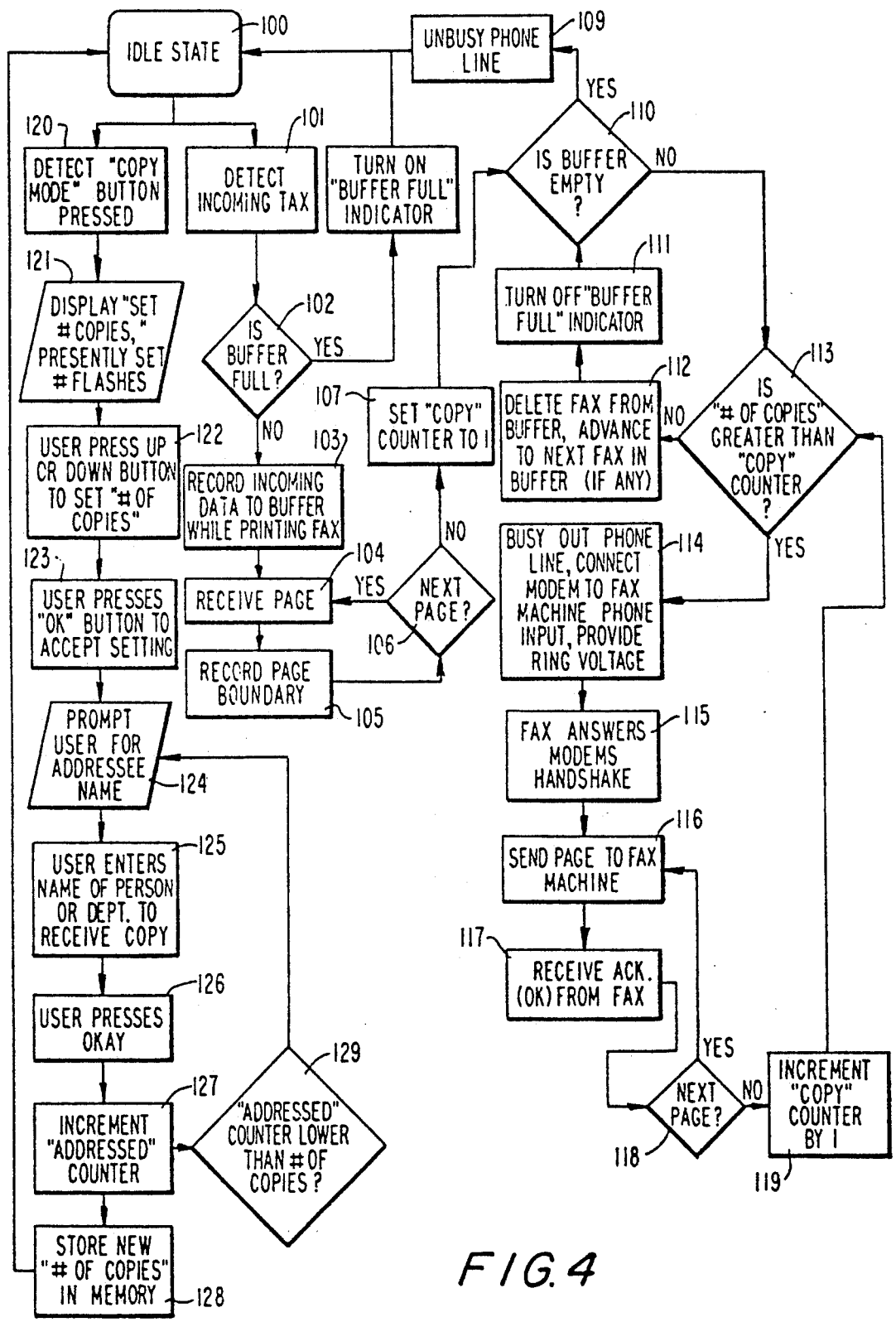
FIG. 4 is a flow unit depicting operation of an automatic multiple copy format according to the instant invention as it would be incorporated directly into a facsimile machine.

FIG. 4 is a flow chart illustrating an integral multiple copy ability format. In this case, the concept of the instant invention is incorporated in the same physical unit as the facsimile machine itself. As above, the user may program in the number of copies and the addressees of each copy. The user depresses a "copy mode" button which is detected by the CPU 4000 as in block 120. The CPU 8000, by means of the operator control panel 7000, directs the user to set the number of copies as the number of copies presently set into the unit flashes on the screen as in block 121. The user then enters the number of copies desired as in block 122 and confirms the entry as in block 123. The CPU 8000 then prompts the user for an addressee name or location as in block 124. The user enters the name of the person or the department to receive the copy as in block 125 and then confirms the direction as in block 126. Each entry is registered on a counter and depicted on the operator control panel 7000 as in block 127. If the amount of addressees is lower than the number of copies as in block 129 the CPU 8000 will prompt the user for the next addressee and continue the process as is illustrated in blocks 124 through 127 until the number of addressees is equal to the number of copies desired. The number of copies is then stored in RAM 9000 as in block 128. Thereupon, the buffer returns to the idle state as in block 100.

If the CPU detects an incoming fax as in block 101, it checks to see if the buffer is full as in block 102. If it is full, the CPU 8000 will indicate on the operator control panel 7000 that the buffer is full as in block 102a. If the buffer is not full, the incoming data is recorded to buffer while the facsimile message is printing as in block 103. The page is received as in block 104 and the page boundary is recorded as in block 105. The CPU 8000 checks to see if more pages are incoming. If yes, the page is received and the boundary is recorded. If no more pages are incoming, the copy counter is set to 1 as in block 107.

The CPU then inquires as to whether the buffer is empty as in block 110. If the buffer is empty the CPU clears the phone line of a busy signal as in block 109 and the buffer returns to the idle state as in block 100. If the buffer is not empty, the CPU checks to see if the number of copies programmed by the user is an amount greater than the amount actually copied as in block 113. If not, then the facsimile message is deleted from the buffer and the unit advances to the next facsimile message in the buffer, if any exists, as in block 112. Because a facsimile message has been deleted from the buffer, the CPU 8000 proceeds to turn off the "buffer full" indicator appearing on the operator control panel 7000.

If the number of copies desired is greater than the copy counter, the CPU 8000 will busy out the phone line, connect the modem 6000 to the facsimile machine input, and provide a ring voltage as in block 114. The facsimile machine 4000 answers the phone line and the respective modems perform normal handshaking as in block 115. The CPU 8000 sends each page of the facsimile message to the facsimile machine as in block 116. The CPU 8000 receives an acknowledgement from the facsimile machine as in block 117 and then asks whether there is another page as in block 118. If yes, the next page is delivered to the facsimile machine 4000, and if no, the facsimile message is over and the increment copy counter increases by one as in block 119. If the number of copies is still greater than that registered by the copy counter, the process will repeat itself.

The examples and embodiments depicted in this specification are not intended to be limitations on the inventive concept herein. Accordingly, one skilled in the art can make modifications in the hardware and/or software which are intended to be covered by this invention.

What is claimed is:

1. A system for producing multiple paper copies of a facsimile message received while said system is unattended at a facsimile location, said system comprising a modular facsimile data storage and retrieval unit adapted to be connected between an external phone line and a facsimile machine, wherein said facsimile data storage and retrieval unit comprises means to store received facsimile signals, said modular facsimile data storage and retrieval unit further comprising means for manually setting at said facsimile location a set number of copies an operator desires to make of received facsimile signals, means responsive to both said means for manually setting and to the reception of facsimile signals to produce said set number of copies of received facsimile signals, and means to cause the automatic unattended printing of said set number of copies of the same received facsimile signals to produce said set number of facsimile paper copies of the same facsimile message, whereby facsimile messages received while said system is unattended are produced in multiple copies and made available for distribution when one retrieves the facsimile messages which were received during the period when the facsimile machine operator unattended to receive messages.

2. A system for storing and retrieving duplicate facsimile information according to claim 1, wherein said unit comprises a ring generator and means to activate said ring generator to cause said facsimile machine to print the received facsimile message stored in said unit each time said ring generator begins to initiate a facsimile receipt mode in said facsimile machine whereby said set number of copies of the same received and faxed facsimile signals are produced.

3. A system as set forth in claim 1, wherein said system further comprises means to identify the name of the recipient of each copy of the facsimile message produced.

4. A system as set forth in claim 1, wherein said system further comprises means to identify the location to which each copy of said facsimile message is to be directed.

5. A system as set forth in claim 1, wherein said system comprises means to determine the number of copies made and means to busy out the phone line until the number of copies made equals said set number of copies to be produced.

6. A system as set forth in claim 2, wherein said system further comprises means to identify the name of the recipient of each copy of the facsimile message produced.

7. A system as set forth in claim 2, wherein said system further comprises means to identify the location to which each copy of said facsimile message is to be directed.

8. A system as set forth in claim 2, wherein said system comprises means to determine the number of copies made and means to busy out the phone line until the number of copies made equals said set number of copies to be produced.

* * * * *